(12) United States Patent
Urien

(10) Patent No.: US 7,194,545 B2
(45) Date of Patent: Mar. 20, 2007

(54) SMART CARD APPLICATIONS IMPLEMENTING CGI AGENTS AND DIRECTORY SERVICES

(75) Inventor: Pascal Urien, Villepreux (FR)

(73) Assignee: CP8 Technologies, Paris (FR)

( * ) Notice: Subject to any disclaimer, the term of this patent is extended or adjusted under 35 U.S.C. 154(b) by 599 days.

(21) Appl. No.: 09/958,724

(22) PCT Filed: Feb. 9, 2001

(86) PCT No.: PCT/FR01/00396

§ 371 (c)(1),
(2), (4) Date: Oct. 10, 2001

(87) PCT Pub. No.: WO01/60026

PCT Pub. Date: Aug. 16, 2001

(65) Prior Publication Data
US 2002/0124092 A1    Sep. 5, 2002

(30) Foreign Application Priority Data
Feb. 10, 2000 (FR) .................................. 00 01664

(51) Int. Cl.
*G06F 15/16* (2006.01)
(52) U.S. Cl. ..................... 709/229; 455/558; 709/202
(58) Field of Classification Search ................ 709/206, 709/217, 229; 235/375, 492; 707/1, 9, 3; 370/522; 710/33
See application file for complete search history.

(56) References Cited

U.S. PATENT DOCUMENTS

| | | | | |
|---|---|---|---|---|
| 5,742,845 A | * | 4/1998 | Wagner | 710/11 |
| 5,901,303 A | * | 5/1999 | Chew | 711/115 |
| 6,011,975 A | * | 1/2000 | Emery et al. | 455/456.1 |
| 6,250,557 B1 | * | 6/2001 | Forslund et al. | 235/492 |
| 6,347,312 B1 | * | 2/2002 | Byrne et al. | 707/3 |
| 6,366,950 B1 | * | 4/2002 | Scheussler et al. | 709/206 |
| 6,438,550 B1 | * | 8/2002 | Doyle et al. | 707/9 |

(Continued)

FOREIGN PATENT DOCUMENTS

JP         05-207029         8/1993

(Continued)

OTHER PUBLICATIONS

Macaire A., Carlier D., "A Personal Naming and Directory Service for UMTS Users", Sixth International Conference on Intelligence in Services and Networks, Apr. 1999, pp. 250-262 XP-000961507.

*Primary Examiner*—William Vaughn, Jr.
*Assistant Examiner*—Greg Bengzon
(74) *Attorney, Agent, or Firm*—Miles & Stockbridge P.C.; Edward J. Kondracki

(57) ABSTRACT

The invention relates to a method for listing a user in a directory server and/or locating a subscriber in an internet-type network (RI), by consulting a directory server ($SA_i$), in such a way as to determine an IP address associated with this subscriber. To do so, a smart card (2a) is used, which stores applications ($A_i$) that are each associated with a listing and/or locating ("PL") protocol. Subscriber profiles can be stored in the smart card (2a). A plurality of different protocols can be stored, converting the smart card (2a) into a multi-directory database. The card (2a) is provided with client/webserver and CGI functions, in such a way as to be capable of initiating transmissions, by internet protocols, between directory servers ($SA_i$) and the smart card (2a) and activating the applications ($A_i$) stored in the card, for the execution of listing and/or locating ("PL") protocols.

Figure 1A:
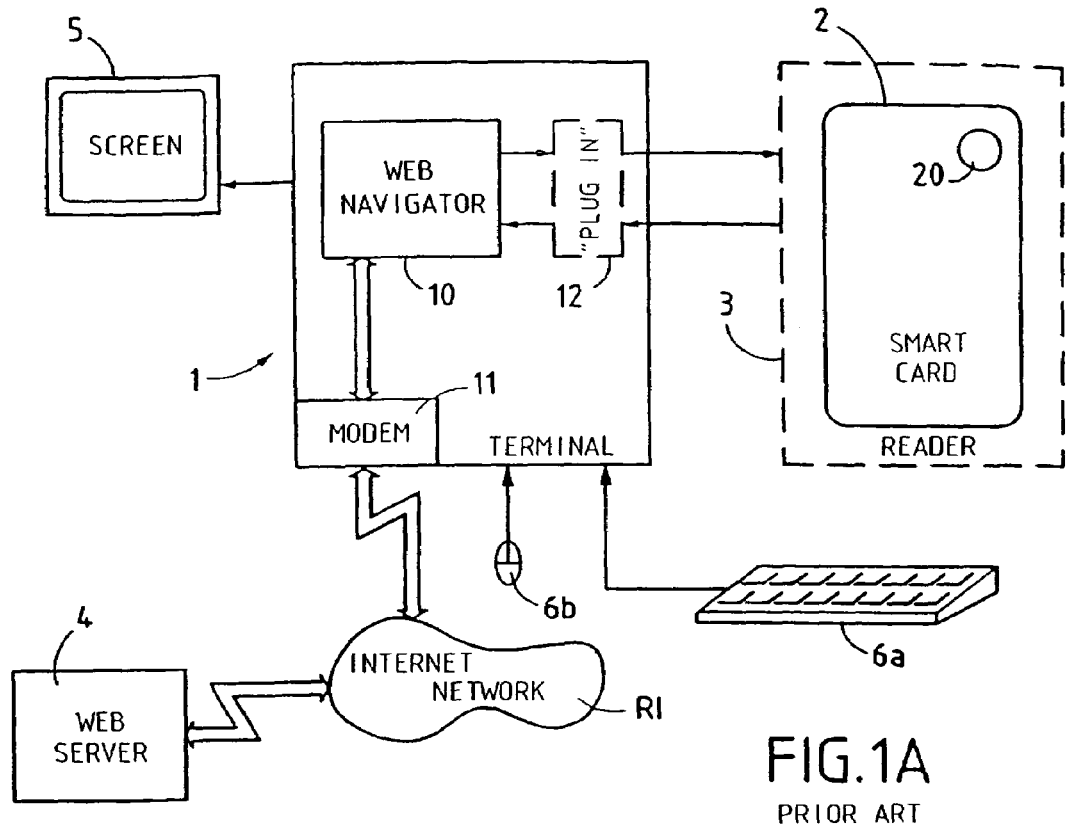

The invention also relates to the associated card.

11 Claims, 6 Drawing Sheets

U.S. PATENT DOCUMENTS

| | | |
|---|---|---|
| 6,446,043 B1 | 9/2002 | Matsumoto et al. |
| 6,498,797 B1 * | 12/2002 | Anerousis et al. ........... 370/555 |
| 6,547,150 B1 * | 4/2003 | Deo et al. .................... 235/492 |
| 6,549,773 B1 * | 4/2003 | Linden et al. ............ 455/426.1 |
| 6,557,752 B1 * | 5/2003 | Yacoob ........................ 235/375 |
| 6,751,459 B1 * | 6/2004 | Lee et al. .................... 455/445 |
| 7,003,663 B2 * | 2/2006 | Lagosanto et al. ........... 713/159 |
| 2004/0040026 A1 * | 2/2004 | Farrugia ...................... 719/310 |

FOREIGN PATENT DOCUMENTS

| | | |
|---|---|---|
| JP | 11-154207 | 6/1999 |
| WO | WO 98/57474 A | 12/1998 |
| WO | WO 99/40549 | 8/1999 |
| WO | WO 00/03363 | 1/2000 |

* cited by examiner

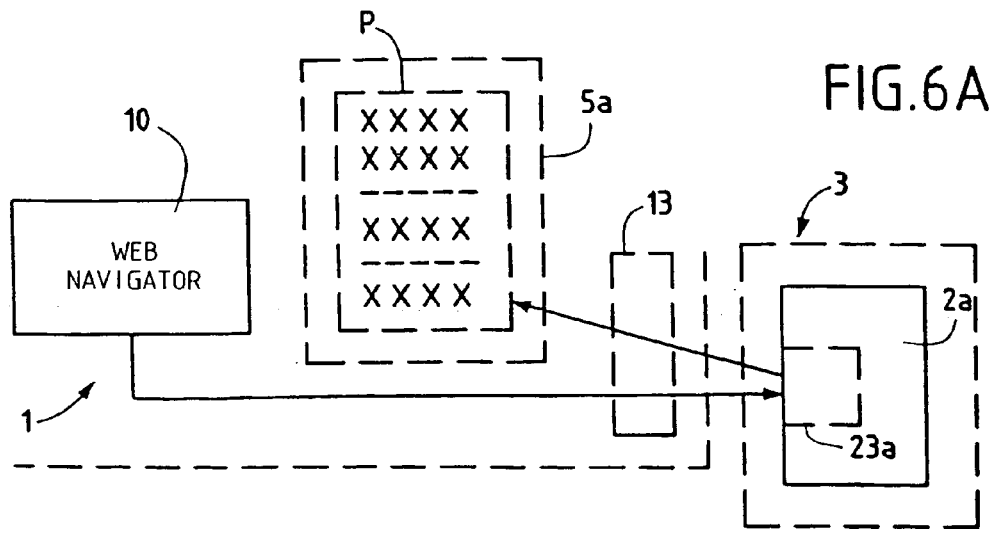
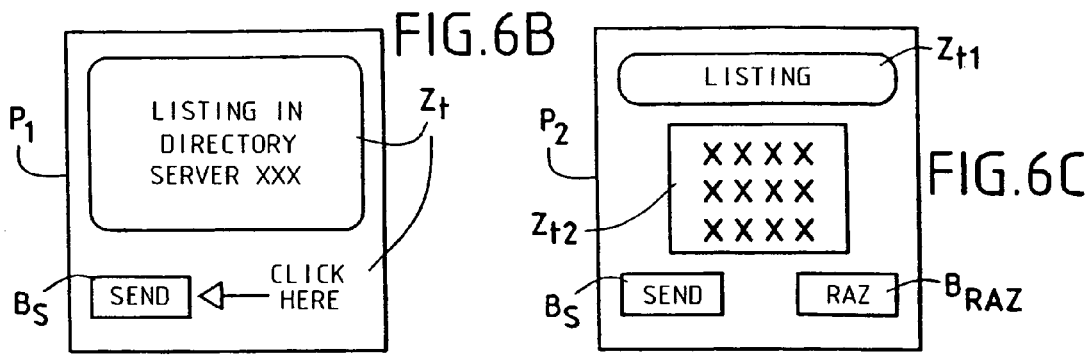
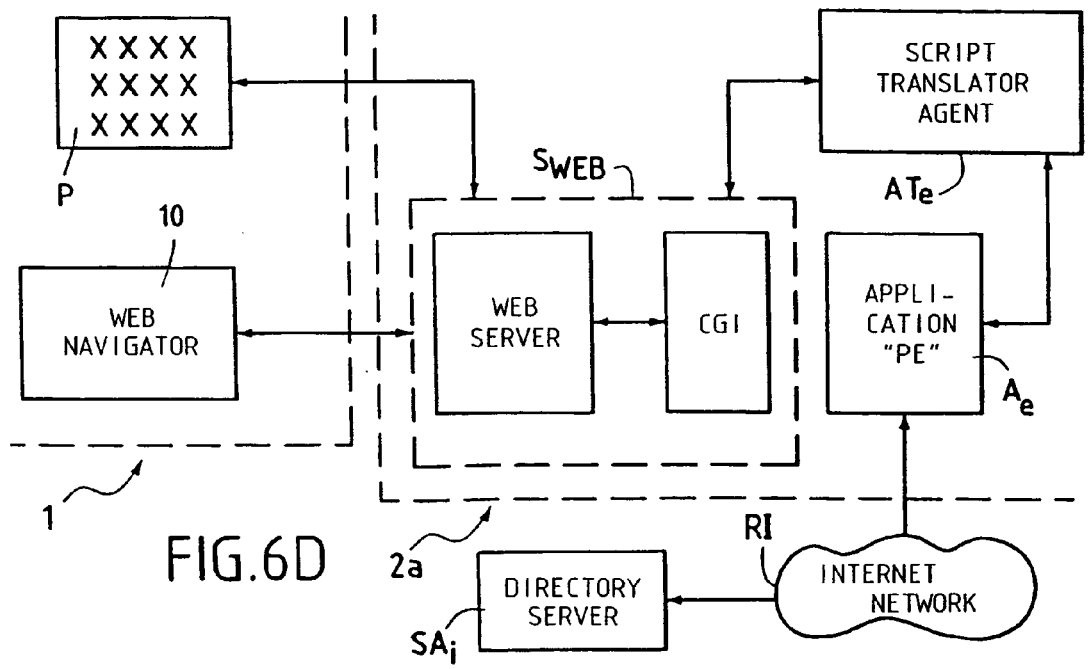

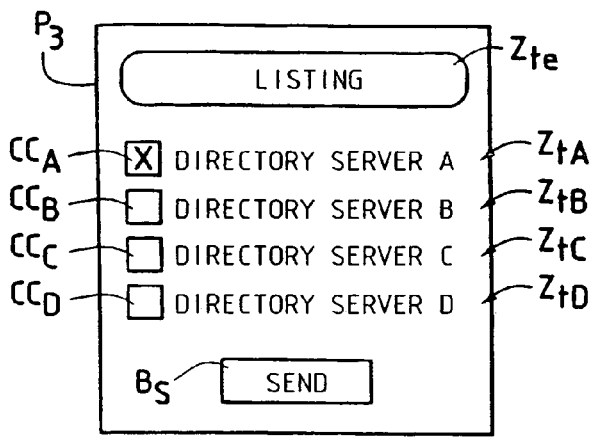
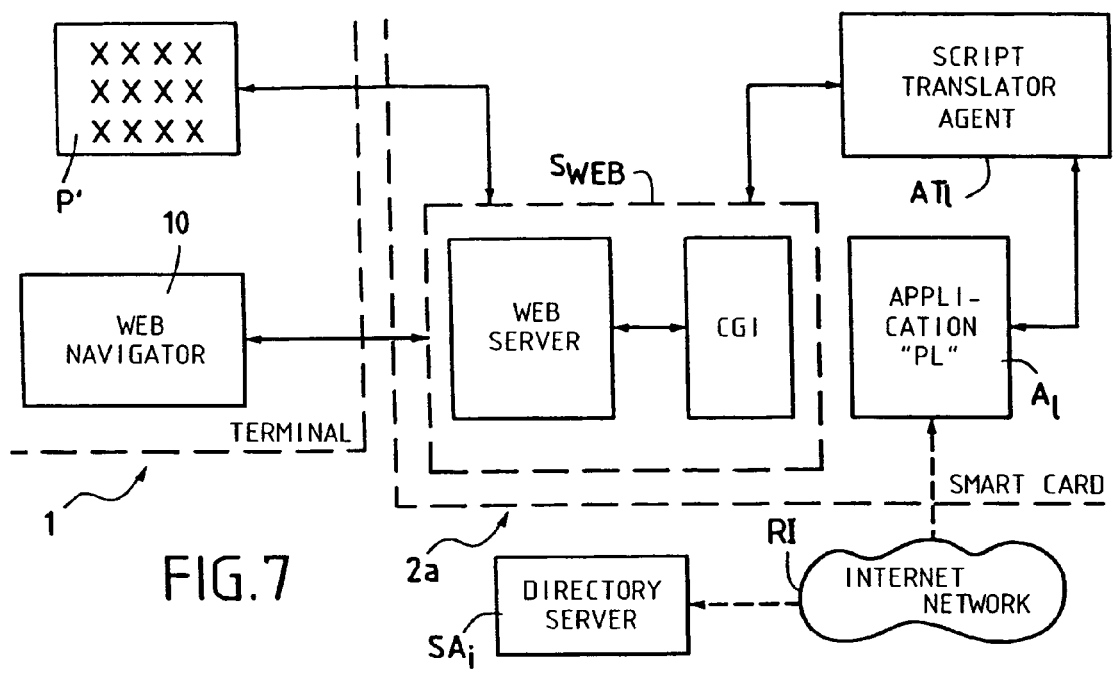
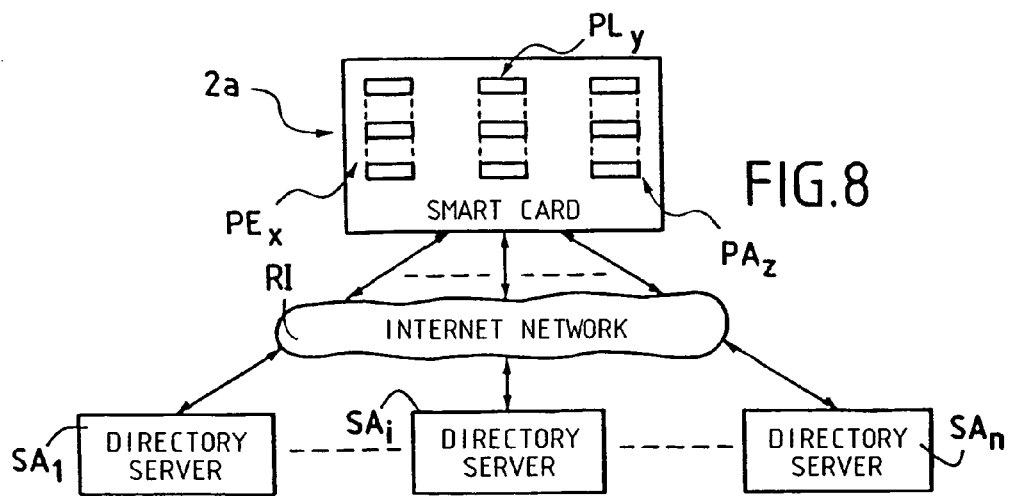

SMART CARD APPLICATIONS IMPLEMENTING CGI AGENTS AND DIRECTORY SERVICES

CROSS REFERENCE TO RELATED APPLICATIONS

The subject matter of this invention is related to application Ser. No. 09/958,791, filed Oct. 10, 2001, in the name of Pascal URIEN, entitled "METHOD FOR MANAGING TRANSMISSIONS OF MULTIMEDIA DATA VIA AN INTERNET-TYPE NETWORK, IN PARTICULAR TELEPHONE OR VIDEOPHONE DATA, AND SMART CARD FOR IMPLEMENTING THE METHOD" and assigned to the assignee of the present invention; application Ser. No. 09/958,726, filed Oct. 10, 2001, in the names of Alain BOUDOU, Pascal URIEN and Christoph SIEGELIN, entitled "METHOD FOR LOADING A PIECE OF SOFTWARE IN A SMART CARD, IN PARTICULAR OF THE TYPE KNOWN AS AN 'APPLET'" and assigned to the assignee of the present invention; and application Ser. No. 09/958,725, filed Oct. 10, 2001, in the name of Pascal URIEN, entitled "METHOD FOR HIGH SPEED DATA STREAM TRANSMISSION TO AN INTERNET-TYPE NETWORK BETWEEN A SERVER AND A SMART CARD TERMINAL, IN PARTICULAR A MULTIMEDIA DATA STREAM'" and assigned to the assignee of the present invention . . . . The subject matter of said applications is hereby incorporated by reference.

The invention relates to a method for listing a user in a directory server of a network, in particular of the internet type, and/or locating a user in such a network, with the aid of smart cards connected to terminals provided with a smart card reader.

The invention also relates to a smart card for performing the method.

Within the scope of the invention, the term "internet network" must be understood in its most general sense. Besides the internet itself, it pertains to private business networks or the like of the type known as "intranet", and networks extending them to the outside, of the type known as "extranet", and in general any network in which data exchanges are done in accordance with an internet-type protocol. In the following description, such a network will be generically called an "internet network".

The term "terminal" must also be understood in a general sense. The aforementioned terminal can in particular comprise a personal computer operating under various operating systems, such as Windows or UNIX (both of these being registered trademarks). It can also comprise a workstation, portable computer, or dedicated card terminal. In the more particular context of the invention, dedicated internet terminals also exist, which have only a minimum of information processing resources per se, or even any means of permanent storage of the hard disk type.

First, it would appear useful to briefly recall the main characteristics of the protocols for communication over networks.

The architecture of communication networks is described by various layers. By way of example, the OSI standard (for Open System Interconnection) defined by the ISO includes seven layers, which range from what are known as lower layers (such as the "physical" layer, which involves the physical transmission substrate) to what are known as high, or upper, layers (such as the "application" layer), passing through intermediate layers, especially the "transport" layer. A given layer offers its services to the layer that is immediately above it, and requests other services, via suitable interfaces, from the layer that is immediately below it. The layers communicate with the aid of primitives. They can also communicate with layers of the same level. In certain architectures, various layers may not be present.

In an environment of the internet type, the layers are five in number, and more precisely, ranging from the highest to the lowest layer, they are: the application layer ("http", "ftp", "e-mail", etc.), the transport layer ("TCP"), the network addressing layer ("IP"), the data link layer ("PPP", "Slip", etc.), and the physical layer.

In the prior art, a user, who will hereinafter be called an "subscriber", uses internet terminals which have a fixed IP address, or a variable one when an internet service provider or ISP is used.

A first disadvantage is the fact that an IP address is not associated with a subscriber but rather with an information processing system connected to the internet network. Even in the case where the information processing system is provided with a fixed address, there is no correspondence a priori between an IP address and a physical person. To establish such a relationship, the subscriber makes a connection with the IRC servers (IRC=Internet Relay Chat). These servers associates the IP address of the subscriber with a subscriber identifier or UserID. The identifier is generally his e-mail address, but an arbitrary pseudonym can also be used. Hereinafter, the IRC servers will be more generally called directory servers, or simply SA.

This association is generally not authenticated, so that the service (typically free) can be used as conveniently as possible. However, this arrangement is not exempt from disadvantages, especially for what called "sensitive" applications.

One of the first constraints encountered is accordingly to locate a subscriber in the internet network RI, that is, to establish a correspondence between a fixed identifier and an IP address.

Locating a subscriber on the internet network RI, that is, establishing the aforementioned correspondence, presupposes that the subscriber was already listed in the directory server SA.

The address of the subscriber in the internet network accordingly comprises a pair: address SA and UserID. In the usual way, the term "subscriber" means a "physical" entity. By extension, it can be a function. However, hereinafter, "subscriber" will be used in its common sense, without in any way limiting the scope of the invention.

In practical terms, a subscriber indicates his location in the internet network RI by a voluntary act, by furnishing the (directory) server his current IP address, using the aforementioned listing protocol PE.

This operation requires that the terminal have a specific (or applications) software issued by the service provider and personalized with a particular subscriber profile, which will be called PA hereinafter. This profile PA makes it possible to identify a subscriber (or internaut) more completely, by its basic identifier "UserID".

The term "subscriber profile" ("PA") generally designates the set of information furnished to the directory server SA at the time the subscriber (subscriber) is listed, for example:

the address of the directory server (SA);

the subscribers (identified by their UserIDs) with which the user is willing to enter into communication, or to whom he wants to notify his location in the network; and the information that he is willing to make public in the directory server (such as name, nationality, contacts sought, and so forth). To contact a correspondent through the internet network RI, this correspondent being duly listed, it is necessary to know his IP address. This information is obtained using a directory server SA and a locating protocol PL.

It should be noted that the subscriber profile PA is by its nature specific to the subscriber, but it can also depend on characteristics of the directory server SA, especially the type and nature of the information that must be furnished to him or that he can accept.

It should finally be noted that the PL protocol, like the PE protocol, is proprietary, since it addresses a directory server that is a priori non-standardized or does not meet universally recognized standards.

These two characteristics represent additional disadvantages.

To summarize the above review, if a first subscriber is to be able to locate other subscribers and be located by them in turn, then the terminal he uses must store specific software programs which make it possible to use the PE and PL protocols. It must also be necessary for the terminal to store data pertaining to its subscriber profile PA. This comment applies similarly to the terminals of other subscribers.

In other words, the terminal used by an arbitrary subscriber is also specific, in the sense that if this subscriber wishes to change terminals he must, in the new terminal used, retrieve at least the software or programs associated with the PL protocol, by acknowledging that he had performed a preliminary listing phase in the first terminal by calling the protocol PE and by furnishing his profile PA to the directory server SA. In fact, the presence of the protocol PL is necessary in order to address the directory server and to have access to the data recorded in it, in particular the IP addresses of the correspondence sought and their profiles PA.

It would accordingly be valuable to use non-standardized terminals to perform the phases of listing and especially of locating subscribers on the internet network RI, as well as signaling (calling the subscriber located, and so forth) and exchanging data, which would make it conveniently possible to achieve the concept called "nomadism".

The programs associated with the aforementioned protocols PE and PL do not typically require having a large amount of memory available. The same is true for the profile data PA. Hence it is possible to conceive of recording them in the memory circuits of a smart card, which current technology does allow.

However, this involves a dual technical difficulty, as will be shown hereinafter, which prevents any direct communication between the internet network RI and a smart card.

Figure 1B:
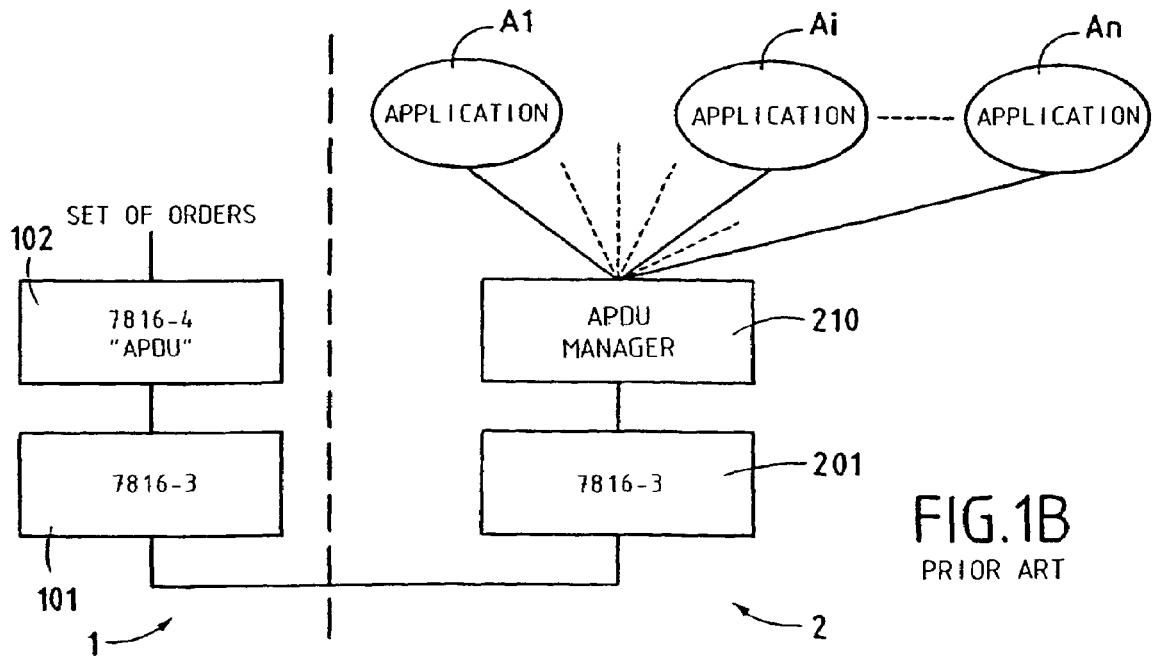

First, the general architecture of a smart card-based applications system will be reviewed briefly, with reference to FIGS. 1A and 1B.

A smart card-based applications system can generally include the following main elements:
 a smart card;
 a host system comprising the aforementioned terminal;
 a communications network, that is, the internet in the preferred application;
 and an applications server connected to the internet.

FIG. 1A schematically illustrates one example of this type of architecture. The terminal 1, such as an individual computer, includes a reader 3 for a smart card 2. This reader 3 may or may not be physically integrated with the terminal 1. The smart card 2 includes an integrated circuit 20 whose input/output connections are flush with the surface of its substrate, to allow a supply of electrical energy and communications with the terminal 1. This terminal includes circuits 11 for access to the internet RI. These circuits can be constituted by a modem for connection to a switched telephone line or a higher-speed communication path, such as the Integrated Service Digital Network (ISDN), cable, or satellite links. The circuits 11 enable connection to the internet RI, either directly or via an internet service provider (ISP). Recourse can also be had to an intermediate system such as a proxy or an insulation system known as a firewall (or guard barrier).

The terminal 1 naturally includes all the circuits and devices necessary for its proper functioning, which have not been shown for the sake of simplifying the drawing: a CPU, random access and read-only memories, magnetic disk mass memory, disk drive and/or CD-ROM drive, and so forth.

Typically, the terminal 1 is also connected to conventional peripherals, either integrated or not, such as a display screen 5, a keyboard 6a and a mouse 6b, and so forth.

The terminal 1 can be put into communication with servers or any information processing systems connected to the network RI, of which a single server 4 is shown in FIG. 1A. The access circuits 11 put the terminal 1 into communication with the servers 4 using a particular software 10, called a web navigator or browser. This enables access to various applications or data files that are distributed over the entire network RI, generally by a client-server mode.

Typically, communications on these networks are done in accordance with protocols that meet standards that include a plurality of superimposed software layers. In the case of an internet-type network RI, the communications are done by protocols that are specific to this type of communications, which will be described in detail hereinafter but which also include a plurality of software layers. The communication protocol for the internet network RI is selected as a function of the particular application contemplated, such as looking up web pages, transferring files, electronic mail (or e-mail), forums, news, etc.

The software architecture of the system including a terminal, a smart card reader and a smart card, is shown schematically in FIG. 1B. It is described by ISO standard 7816, which in turn includes several subsets:
 ISO 7816-1 and 7816-2, pertaining to the dimensions and marking of cards;
 ISO 7816-3, pertaining to the transfer of data between the terminal and the smart card; and
 ISO 7816-4, pertaining to the structure of the set of orders and the format of commands.

In FIG. 1B, for terminal 1, only the layers meeting ISO standard 7816-3, identified by reference numeral 101, and an APDU order manager (ISO 7816-4), reference numeral 102 are shown. For the smart card 2, the layers meeting ISO 7816-3 are identified by reference numeral 200, and the APDU order manager (ISO 7816-4) has reference numeral 201. The applications carry reference symbols $A_1, \ldots A_i, \ldots A_n$, where n is the maximum number of applications present in the smart card 2.

An application $A_i$ in the smart card 2 (FIG. 1A) conducts a dialog with the terminal 1 by means of a set of orders. This set typically has writing and reading orders. The order format is known by the abbreviation APDU ("Application Protocol Data Unit"). It is defined by the aforementioned ISO standard 7816-4. A command APDU is written as "APDU.command", and a response APDU is written "APDU.response". The APDUs are exchanged between the card reader and the smart card by means of a protocol specified by the aforementioned ISO standard 7816-3 (for example, in the character mode: T=0; or in the block mode: T=1).

When the smart card 2 includes a plurality of distinct applications, as illustrated by FIG. 1B, it is called a multi-application card. However, the terminal 1 is in a dialog with only one application at a time.

The selection of a particular application $A_i$ is obtained with the aid of an APDU of the selection type ("SELECT"). Once this choice has been made, the APDUs that follow are routed through this application. A new "APDU SELECT" causes the current application to be abandoned so that another one is then chosen. The software manager subset of the APDUs 201 makes it possible to choose a particular application $A_i$ in the smart card 2, to memorize the application thus chosen, and to transmit and/or receive APDUs to and from this application.

To summarize what has just been described, the selection of an application $A_i$ and dialog with it are done by exchanges of APDU orders. Let it be assumed that the applications $A_i$ are conventional applications, hereinafter called GCAs (for Generic Card Application).

Given the above review, it should be noted that the smart card 2 cannot communicate directly with standard commercial navigators except by modifying their code.

Furthermore and above all, current smart cards, which moreover meet the standards described above, have a hardware and software configuration that no longer allows them to communicate directly with the internet. In particular, they cannot receive and transmit data packets by one or the other of the protocols used in this type of network. Hence it is necessary to provide an additional piece of software, implanted in the terminal 1, generally in the form known as a "plug-in". This piece of software, which is identified by reference numeral 12 in FIG. 1A, acts as the interface between the navigator 10 and the card 2, and more specifically the electronic circuits 20 in this card 2.

The invention seeks to overcome the disadvantages of the methods and apparatus of the prior art, some of which have just been recalled, while meeting the needs that result.

In an advantageous embodiment of the invention, the applications required for implementing the listing (PE) and recording (PL) protocols, like the data characterizing the subscriber profile (PA), are files that are stored, entirely or in part, in the memories of a smart card, the executable files being standard applications of the aforementioned GCA type.

According to the invention, the smart card behaves like a webserver/client with regard to the terminal with which it is associated.

To attain this object, a specific communication protocol layer is provided in the smart card and its counterpart in the terminal. The term "specific" must be understood to mean specific to the method of the invention. In fact, these communication layers, called specific communication layers, are non-specialized, regardless of the application in question. In particular, they are independent of the applications required to employ the protocols PE and PL. They act only in the process of bidirectional data exchanges between the smart card and the terminal on the one hand, and the smart card and the network, on the other.

The specific communication software layer, known as "intelligent agents", make it possible in particular to convert protocols. The intelligent agents will hereinafter be called simply "agents". There are matched agents in the specific communication layers assigned to the terminal and the smart card, respectively. By the method of the invention, sessions between matched agents are established.

Advantageously, the method of the invention makes it possible to activate applications of a conventional type, that is, of the aforementioned GCA type, that are located in a smart card, without having to modify them in any way.

To do so, one or more particular intelligent agents called script translators are provided, which receive requests from a navigator and translate them into APDU orders that can be understood by the GCA application. In this way, a function similar to that also known as "CGI" in conventional webservers is implanted into the smart card. This function makes it possible to implement an application in the smart card using an internet protocol of the http type.

These various applications enable the smart card, and more precisely the applications present in it, to communicate directly with a remote server connected to the internet network by using protocols of the internet type. The CGI function offered by the smart card for its part makes it possible to access applications associated with the protocols PE and PL, respectively, and executing them, without requiring the presence of applications of a proprietary type in the terminal. Only a navigator, typically of the standard commercial type, is required.

In a preferred variant of the invention, a plurality of sets, comprising separate applications associated with the protocols PE and PL and/or subscriber profiles PA, are stored in the smart card.

This advantageous arrangement makes it possible on the one hand to record a plurality of separate subscriber profiles PA or a plurality of separate occurrences of the same subscriber profile PA in the same directory server SA, and to locate these entities by associating them with unique IP addresses. On the other hand, it also makes it possible to address a plurality of directory servers SA, using one and the same or a plurality of separate subscriber profiles PA. The smart card then has a multi-directory database function.

Accordingly, the principal subject of the invention is a method for putting a first user in relation with at least one directory server, with a view to listing him and/or locating at least a second user in a network, in particular of the internet type, said relation being effected by way of a terminal provided with a smart card reader and at least one piece of software, called listing and/or locating software, said terminal being connected to each of said directory servers via said internet-type network and communicating with smart card by a first predetermined protocol, characterized in that at least one of said pieces of software is stored in said smart card; that, because this smart card includes a first piece of software, forming a specific communication protocol layer, and because said terminal includes a second piece of software, forming a specific communication protocol layer, said first and second pieces of software further include at least one pair of first matched software entities, each of said entities cooperating with one another in such a way as to enable to establishment of a bidirectional data exchange session between at least said terminal and said smart card, and/or said internet-type network, in such a way that said smart card offers the function of a client/webserver; that said smart card includes at least a second software entity cooperating with said specific piece of software so that said smart card offers a gateway interface function known CGI;

and that it includes at least the following steps:

1) opening a first sequence of data exchanges between at least said terminal and said smart card, for the transmission of a request for said web navigator to retrieve data enabling the selection and activation of one of said proprietary pieces of software, with a view to selecting one of said directory servers;

2) opening a second sequence of data exchanges between said smart card and said terminal in order to transmit said data to the terminal;

3) opening a third sequence of data exchanges between said terminal and said smart card to transmit selection data and optional parameters, said data and optional parameters including a reference to one of said pieces of listing and/or locating software;

4) implementing said CGI function and execution of said piece of listing and/or locating software; and 5) as a result of said execution, opening a fourth sequence of data exchanges between said smart card and one of said directory servers, selected by said selection data, in such a way as to transmit a request to perform a predetermined listing or locating operation.

The subject of the invention is also a smart card for performing this method.

Figure 2:
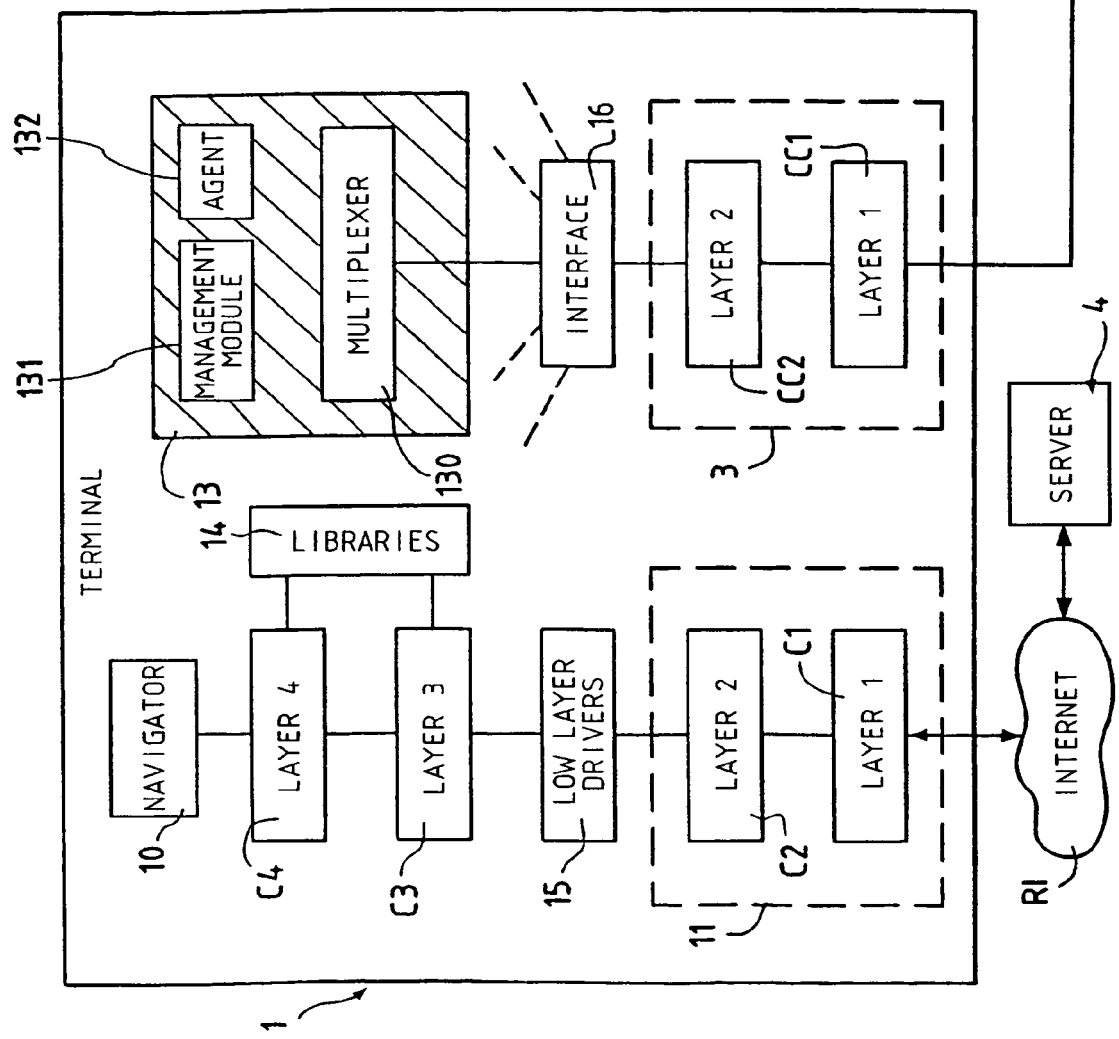
Figure 3:
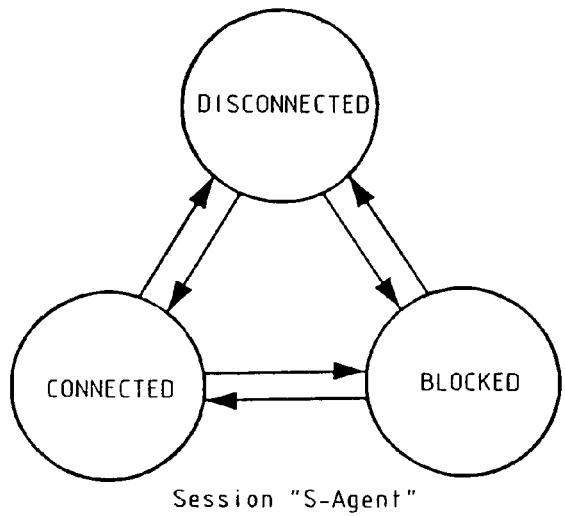
Figure 4:
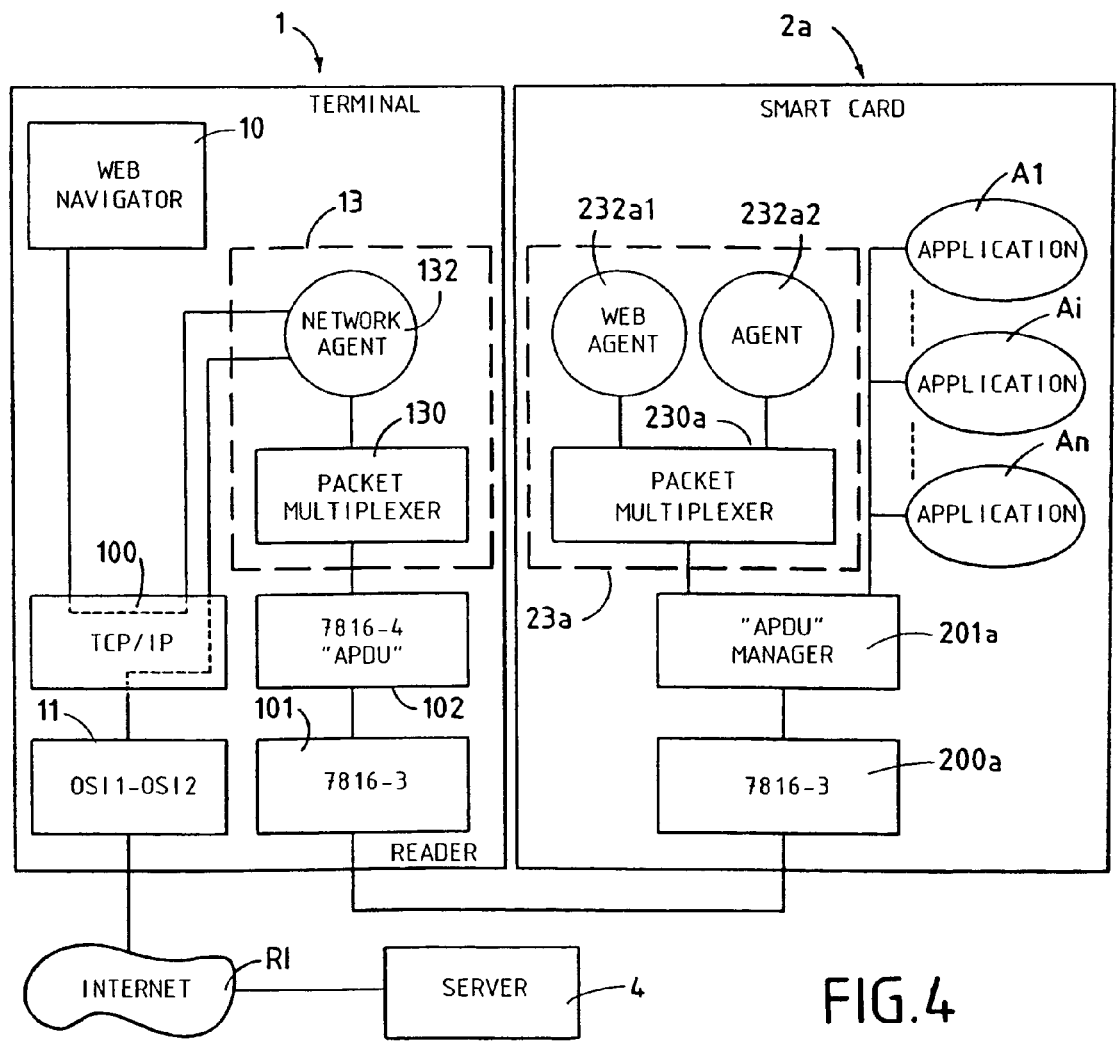
Figure 5:
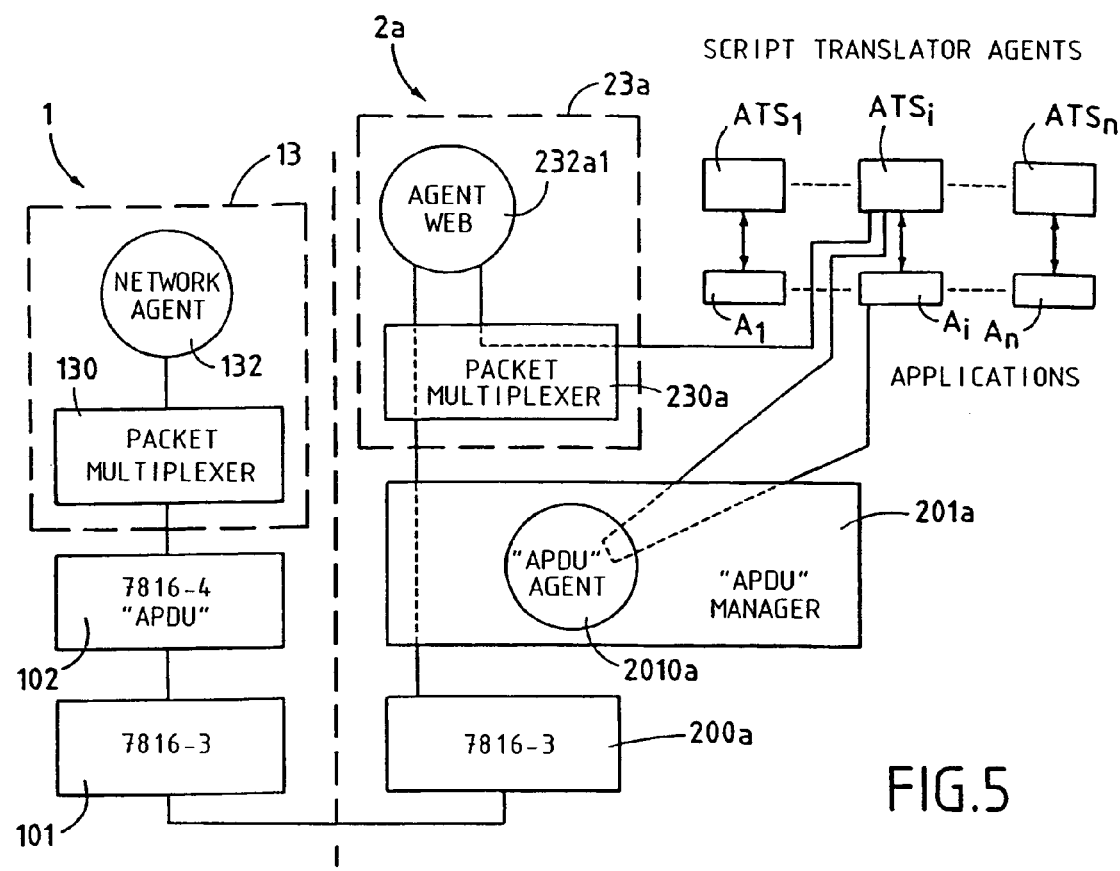

A preferred but not limiting mode for embodying the invention will now be described in more detail, in conjunction with the accompanying drawings, in which:

FIGS. 1A and 1B illustrate the hardware and logical architectures, respectively, of a smart card-based applications system connected to an internet network, according to the prior art;

FIG. 2 schematically illustrates an example of a smart card-based applications system according to the invention, which acts as a client/webserver, according to one aspect of the invention;

FIG. 3 is a diagram showing states of a session between software entities, called intelligent agents, according to one aspect of the invention;

FIG. 4 in simplified fashion shows the logical architecture of a system according to the invention, in which the smart card includes intelligent agents;

FIG. 5 in simplified fashion illustrates the logical architecture of a system in another aspect of the invention, in which the smart card includes intelligent script translator agents, in such a way as to implant a CGI function;

FIG. 6A schematically illustrates a first step of the phase of listing a subscriber in a directory server;

FIGS. 6B and 6C illustrate examples of HTML forms that can be used for this listing phase;

FIG. 6D schematically illustrates the main steps of the phase of listing a subscriber in a directory server;

FIG. 6E schematically illustrates the main steps in the phase of listing a subscriber in a directory server;

FIG. 7 schematically illustrates the main steps in the phase of locating a subscriber in the internet network by consulting a directory server; and FIG. 8 schematically illustrates a smart card architecture according to the invention, having a portable multi-directory database function.

FIG. 2 schematically illustrates an example of a smart card-based applications system in a first aspect of the invention, enabling the smart card to act as a client/webserver.

With the exception of specific communication protocol software layers 13 and 23a implanted in the terminal 1 and the smart card 2a, respectively, the other hardware and software elements are common to the prior art, especially that described above in conjunction with FIGS. 1A and 1B, and there is no need to describe them again in detail here.

The terminal 1 includes circuits 11 for access to the network RI, the circuits being constituted by a modem, for example. These circuits include the lower software layers $C_1$, and $C_2$, which correspond to the physical and data link layers.

Also shown are the upper layers $C_3$ and $C_4$, which correspond to the network addressing (IP, in the case of the internet) and transport (TCP) layers. The upper application layer ("http", "ftp", "e-mail", etc.) has not been shown.

The interface between the lower layers $C_1$, and $C_2$ and the upper layers $C_3$ and $C_4$ is made up of a software layer, generally called a "low driver layer". The upper layers $C_3$ and $C_4$ rest on this interface and are implemented by way of specific function libraries or network libraries 14, with which they correspond. In the case of the internet, TCP/IP is implemented by means of what are known as "socket" libraries.

This organization enables a navigator 10 to make requests of a server 4 to consult web pages ("http" protocol) to transport files ("FTP" protocol) or to send electronic mail ("e-mail" protocol), in an entirely classical fashion.

The terminal 1 also includes a card reader 3, which may or may not be integrated. For communication with the smart card 2a, the card reader 3 also includes two low layers $CC_1$ (physical layer) and $CC_2$ (data link layer), which play a role similar to the layers $C_1$ and $C_2$. The software interfaces with the layers $CC_1$ and $CC_2$ are described for example by the PC/SC specification (part 6, service provider). The layers themselves, $CC_1$ and $CC_2$, are described in particular by ISO standards 7816-1 through 7816-4, as has been noted above.

An additional software layer 16 forms an interface between the application layers (not shown) and the lower layers $CC_1$ and $CC_2$. The main function assigned to this layer 16 is that of multiplexing/demultiplexing.

Communications with the smart card 2a are done by a paradigm similar to that used to manipulate files in an operating system of the UNIX type (UNIX is a registered trademark): OPEN, READ, WRITE, CLOSE, etc.

A similar organization is found in the smart card 2a, that is, the presence of two low layers, $CCa_1$ (physical layer) and $CCa_2$ (data link layer), as well as an interface layer 26a, which is entirely similar to the layer 16.

In accordance with the invention, two specific protocol layers 13 and 23a, respectively, are provided on one hand and other, that is, in the terminal and in the smart card 2a.

In the terminal 1, the specific layer 13 interfaces with "low driver layers" 15, libraries 14 of network layers $C_3$ and $C_4$, and protocol layers for the card reader 3, that is, the lower layers $CC_1$ and $CC_2$, via the multiplexing layer 16. The specific layer 13 enables the transfer of network packets from and to the smart card 2a. It also adapts the existing applications, such as the internet navigator 10, e-mail, etc., for uses that employ the smart card 2a.

In the smart card 2a, quite a similar organization is found, with an additional instance of the specific layer 23a, which is the counterpart of the layer 13.

More precisely, the specific layers 13 and 23a are subdivided into three main software elements:

a module 130 or 130a for transferring blocks of information between the layers 13 and 23a, via the conventional layers $CC_1$, $CC_2$, $CCa_1$, and $CCa_2$;

one or more pieces of software, called intelligent agents, 132 or 232a, which by way of example embody protocol conversion functions;

and a specific configuration management module 131 and 231a, respectively, which module can be likened to a particular intelligent agent.

For the sake of simplicity, these intelligent agents will be called simply agents hereinafter, as noted above.

In the terminal 1 and the smart card 2a, a communication protocol stack is found between the two entities.

The layers at level two (data link layers) $CC_2$ and $CCa_2$ assure the exchange between the smart card 2a and the terminal 1. These layers are responsible for detecting and as needed correcting transmission errors. Various protocols can be used, and by way of a non-exhaustive example, the following:

the recommendation ETSI GSM 11.1;

the protocol defined by ISO 7816-3, in character mode T=0;

the protocol defined by ISO 7816-3, in block mode T=1;

or the protocol defined by ISO standard 3309, in HDLC (High-level Data Link Control procedure) frame mode.

Within the scope of the invention, the ISO 7816-3 protocol in block mode will preferably be used.

In a manner known per se, a certain number of primitives is assigned to each protocol layer; they enable the exchanges of data between layers of the same level and from one layer to the other. By way of example, the primitives assigned to the level 2 layer are of the "data request" ("Data.request") and "send data" ("Data.response") by the card as well as "confirmation of data" ("Data.confirm"), etc.

More specifically, the layers 13 and 23a are tasked with dialog between the smart card 2a and the host, that is, the terminal 1. These layers enable the exchange of information between a user (not shown) of the terminal 1 and the smart card 2a, for example by way of scrolling menus in the form of hypertext in the HTML format. They also allow the installation of a configuration adapted for the transmission and/or reception of data packets.

As indicated above, the layers include three distinct entities.

The first layer 130 or 230a essentially comprises a software multiplexer. It enables the exchange of information between the smart card 2a and the host terminal 1, in the form of protocol data units. It plays a role similar to that of a data packet switcher. These units are sent or received via the layer at level 2 (data link layer). This particular communication protocol makes it possible to put at least one pair of agents into communication. The first agent of each pair, 132, is located in the layer 13 of the terminal 1, while the second agent, 232a, is located in the layer 23a in the smart card 2a. A link between two agents is associated with a session that will be called "S-Agent". A session is a bidirectional data exchange between these two agents. If one or the other of the layers 13 and 23a includes a plurality of agents, then the agents of the same layer can also establish sessions between them and/or with the modules 131 and 231a that constitute the particular agents.

More precisely, an agent is an autonomous software entity, which can embody all or some of the functions of layers at levels 3 and 4, depending on the configuration implemented by the terminal 1.

These agents are assigned particular properties or attributes. To define the concepts, and by way of non-limiting examples, the following six properties are assigned to the agents:

"host": agent located in the terminal;

"card": agent located in the smart card;

"local": agent not communicating with the network;

"network": agent communicating with the network (in the terminal);

"client": agent which initializes a session;

"server": agent which receives a session request.

A particular agent is identified by a reference, such as a 16-bit integer (that is, an integer between zero and 65535).

The most significant bit (b15=1) tells whether this reference is local (local communications with the smart card or the terminal) or remote (b15=0).

Two large categories of agents exist: the agents of the "server" type, which are identified by a fixed reference, and the agents of the "client" type, which are identified by a variable reference that can also be called ephemeral, issued by the configuration management module 131 or 231a.

The agents communicate with one another by way of entities called protocol data units or pdus, which include a target reference and a source reference. This particular pdu can also be called a "SmartTP pdu", with reference to the currently used term "smart card". In particular, the pdus utilize the references defined above.

A SmartTP pdu, or more simply pdu hereinafter, includes a source reference, a target reference, a set of bits comprising flags, which specify the nature of the pdu, and optional data:

the "OPEN" flag is in place to indicate the opening of a session;

the "CLOSE" flag indicates the closure of a session; and the "BLOCK" flag indicates that the agent is waiting for a response from its correspondent and has suspended all activity.

A pdu that does not include data will be called a token.

The SmartTP entity controls the existence of the target agent and performs the commutation of a packet to it.

An agent session or "S-Agent" has three notable states, specifically:

a disconnected state: no session is open with any other agent;

a connected state: a session is open with another agent, an "S-Agent" session being identified by a pair of references; and a blocked state, where the agent is connected and is waiting for a response from its correspondent.

The mechanism for establishing an "S-Agent" session is as follows:

a new instance of a client agent is created (in the smart card or the terminal), this agent being identified by a pseudo-unique ephemeral reference;

the client agent sends a pdu to a server agent (whose reference is furthermore known) with the "OPEN" flag in place, and the client agent shifts to the connected state or the blocked state, depending on the value of the "BLOCK" flag; and the server agent receives the pdu with the "OPEN" flag and shifts to the connected state.

Once a session is open, two agents exchange data via pdus.

The mechanism for closing a session is as follows:

one agent sends a pdu with the "CLOSE" flag in place (which may possibly include data); and the other agent receives a pdu with the "CLOSE" flag in place (which may possible include data), and the "S-Agent" session shifts to the disconnected state.

FIG. 3 schematically illustrates the diagram of states of "S-Agent" sessions, such as have just been described.

The layers 130 and 230a manage tables (not shown) that contain the list of agents present, in the host terminal 1 and the smart card 2a.

In practical terms, the agents enable an exchange of data (in hypertext, for example), but also enable launching network transactions, authorizing communications between the smart card 2a and a remote server 4 (FIG. 2).

The configuration management modules, 131 and 231a, respectively, are similar to particular agents. For example, the module 131 in the host terminal 1 in particular manages information relating to the configuration of this terminal (modes of operation), lists other agents present, and so forth. The module $231a$ in the smart card $2a$ has analogous functions. These two agents can be put into communication with one another in order to establish a session.

In practical terms, the smart card $2a$ is advantageously "addressed" by using a URL (for universal resource locator) that defines a feedback to the terminal 1 itself, rather than pointing to an external server. By way of example, the structure of this URL is typically as follows:

$$\text{http://127.0.0.1:8080} \qquad (1)$$

in which 127.0.0.1 is the feedback IP address, and 8080 is the port number.

FIG. 4 in simplified fashion shows the software architecture of a system according to the invention, of the type shown in FIG. 2 but now shown in more detail. The smart card $2a$ includes a plurality of agents, only two of which are shown: an agent $232a_1$ whose type is not precisely defined, of the web type, and an agent $232a_2$, of the web type. The software stack includes the lower protocol layers $200a$, which meet ISO standards 7816-3 (FIG. 2: $CCa_1$ and $CCa_2$), the APDU command manager $201a_1$, and the packet multiplexer $230a$, this latter being interfaced with the agents, in particular the web agent $231a_1$.

There are two stacks in the terminal, one communicating with the internet RI and the other with the smart card $2a$. The first stack includes the devices 11 (FIG. 2: $C_1$ and $C_2$) for access to the network (standards OSI 1 and 2), and the TCP/IP protocol layers (FIG. 2: $C_3$ and $C_4$), reference numeral 100. These third layers are interfaced with the web navigator 10. The other stack includes the lower protocol layers 101, which meet ISO standards 7816-3 (FIG. 2: $C_1$ and $C_2$), the APDU order manager 102, and the packet multiplexer 130, this last being interfaced with agents, only one of which, 132, is shown. Assuming that this agent is of the network type, it can furthermore communicate on the one hand the navigator 10, via the TCP/IP layers 100, and on the other with the internet RI, via these same TCP/IP layers 100 and the device 11 for access to the network RI.

The APDU order manager $201a$ is also interfaced with one or more applications-level layers, which will simply be called applications. As has been noted, these applications $A_1 \ldots, A_i \ldots, A_n$, are application of a conventional type.

In summary, the client/webserver furnished by the smart card $2a$ can be embodied by association with the web agent $232a_1$ in the smart card and the network agent 132 in the terminal 1, and by implementing sessions between agents, as has been described.

The smart card $2a$ does indeed have the function of client/webserver. In addition, in an advantageous characteristic of the invention, any conventional application $A_1$ through $A_n$ of the GCA type mentioned above can be activated through this client/webserver, either via the web navigator 10 in the terminal 1 or via a remote navigator 4 located at any point in the internet RI, by implementing sessions between agents. According to the method of the invention, the applications $A_1$ through $A_n$ do not have to be rewritten and are implemented as is.

In the context of the invention, all or some of the applications $A_1$ to $A_n$ can be constituted by applications associated with one or more protocols PE and/or one or more protocols PL, etc., and loaded into a memory of the smart card $2a$. Data representing one or more profiles PA can also be stored in the smart card $2a$.

The client/webserver function offered by the smart card $2a$ is not sufficient to enable an application to be executed. An additional function must be attached to In fact, in another aspect of the invention, the webserver function offered by the smart card $2a$ includes a mechanism similar to the function known as CGI (Common Gateway Interface) implanted in conventional webservers.

Before describing an example of architecture according to the invention that makes it possible to achieve a function of this type, even at the level of the smart card, it is useful to recall the principle characteristics of a CGI mode of operation.

CGI is a specification for implementing, from a webserver, applications written for the operating systems known as UNIX (registered trademark), DOS, or Windows (registered trademark). By way of example, for the UNIX operating system, the specification is CGI 1.1, and for the Windows 95 operating system, the specification is CGI 1.3.

Still by way of example, an http request for a URL address, of the following type:

$$\text{"http://www.host.com/cgi-bin/xxx.cgi"} \qquad (2),$$

in which "host" refers to a host system (generally remote), is interpreted by a webserver as the execution of a command script of the CGI type, named "xxx" and present in the "cgi-bin" directory of this host system. Although the name of the directory can a priori be arbitrary, by convention it is the name given to the directory that stores scripts of the CGI type. A script is a set of instructions of the host system operating system, whose final result is transmitted to the web navigator that sent the aforementioned request. Different languages can be used to write the script, such as PERL (registered trademark).

In practical terms, the request is typically posted on an information processing screen as a form comprising an HTML page. The HTML language makes it possible to translate a form into a URL address. The form includes one or more fields which may or may not be obligatory and which are filled by a user, using conventional input means: a keyboard for text, a mouse for putting an X in boxes to be checked, or buttons labelled "radio", etc. The contents of the form (and as applicable, information and instructions said to be "cached") is sent to the webserver. The HTML code of the page describes the physical structure of the form (context, graphics, color, and any other attribute), and the structure of the data fields to be input (name, length, type of data, etc.).

The transmission can be done by two main types of format. A first format uses the method known as "POST", and a second uses the method known as "GET". Information on the format type is present in the code of the form page.

This mechanism cannot, however, be transposed directly to a smart card, even if the smart card has the client/webserver function in accordance with one of the characteristics of the invention.

An example of architecture that makes it possible to activate any application of convention type, via a webserver to the smart card, will now be described in conjunction with FIG. 5.

Among the intelligent agents, in accordance with one of the aspects of the invention, particular intelligent agents are provided, which will hereinafter be called script translator agents, abbreviated ATS. The script is then interpreted by one of the intelligent agents. This translation can be done in various ways:

a) by the web agent $232a_1$ itself, which in this case is provided with a dual capacity;

b) by a unique script agent capable of translating all the scripts present in the smart card 2a;

c) by a dedicated script agent, which will be called "ATSD" hereinafter (one agent per script); or d) by an APDU agent 2010a of the APDU order manager 201a, which in this case is provided with a dual capacity.

The APDU agent 2010a is a component of the APDU order manager layer 201a. The latter is a layer capable of centralizing all the APDU orders sent and/or received by the system, selecting from among applications $A_1$ to $A_n$, but also of offering an interface of the intelligent agent type. It is accordingly capable, according to the one of the characteristics of the invention, of communicating with all the intelligent agents (via sessions), whether the agents are located in the housing 6 or the smart card 2a.

In case c) above, a session is opened between the web agent 1 and one of the ATSD agents.

FIG. 5 shows an example of an architecture for which the translator agents are of the ATSD type. They are assigned reference symbols $ATS_1$ through $ATS_n$ and are associated with the applications $A_1$ through $A_n$. The application selected is assumed to be the application $A_i$ and the session is established between the web agent $_1$ and the agent $ATS_i$.

A script translator agent generates a set of APDU orders. A session is opened between the translator agent, such as the agent $ATS_i$ and the APDU agent 2101a. The orders are then sent to the APDU agent 2101a. The APDU order manager 210a selects the GCA application $A_i$ and sends it the APDU orders, which orders are translated and accordingly conventional, that it is capable of understanding. This application is then correctly activated without requiring modification or rewriting.

The responses from the application $A_i$ are transmitted to the APDU order manager 210a, to the APDU agent 2010a, and again to the agent $ATS_i$ (and more generally to the script translator agent).

The various pathways are symbolically represented in FIG. 5 by solid lines connecting function blocks, or dotted lines within these blocks.

The method according to the invention uses the two characteristics that have just been reviewed: the functioning of the smart card as a webserver/client, including a CGI function.

The various phases and steps in the method of the invention will now be described, in conjunction with FIGS. 6A through 8.

The first phase has to do with listing a subscriber profile in a particular directory server, which will hereinafter be called $SA_i$.

In a first step, shown in FIG. 6A, the smart card 2a is addressed by the navigator 10 of the terminal 1, via the layers 13 and 23a. By a command of the "GET" type, for example, a loading form is retrieved from the smart card 2a, the form being in HTML, which will arbitrarily be called "download.html".

This retrieval is done by consulting a corresponding page whose URL typically takes the following form:

http://127.0.0.1:8080/download.html  (3), in which http://127.0.0.1:8080 is the URL feedback address per se, as defined by relation (1), and "download.html" is the HTML page to be obtained. This request employs a session between intelligent agents as has been described in conjunction with FIGS. 2–4, in a first aspect of the invention. The smart card 2a then plays the role of a webserver.

The smart card 2a sends the form "download.html" in a second step, still by opening sessions between matched intelligent agents, by the method of the invention. The form obtained can be posted on a screen 5 by way of the navigator and is identified by P in FIG. 6A, which schematically illustrates this process. This form is a welcome page for the subscriber wishing to be listed in a directory server $SA_i$. The smart card 2a then behaves like a webserver.

The page P can in the usual way include various graphic and/or text elements, as well as interactive command elements (button of the "radio" type, boxes to be checked, data input zones, etc.).

Let it be assumed that in a first period of time, the smart card 2a offers its holder (not shown) the possibility of being listed on a unique directory server, which will be called $SA_u$, and in accordance with a unique subscriber profile, which can be called $PA_u$. Let it also be supposed that this unique profile $PA_u$ is recorded in the smart card 2a. On this hypothesis, the form P (that is, the welcome page) displayed on the screen 5a can be reduced to a minimal presentation, of which FIG. 6B illustrates one possible example, that is, form $P_1$.

The form $P_1$ includes various text zones, under the unique reference symbol $Z_t$. These zones typically display the name "xxx" of the directory server ($SA_u$), the action proposed, that is, "listing", and various help items (such as "click here").

Since it has been assumed that the data of the subscriber profile $PA_u$ were recorded in the smart card 2a, it suffices to provide a send button $B_s$. When the internaut clicks on the button using a mouse (6b in FIG. 1A) or presses on the "enter" key of a keyboard (6a in FIG. 1A), this launches the sending of the form to the smart card 2a.

In another variant of the method of the invention, the data pertaining to the subscriber profile are captured directly by it. In this hypothesis, the form is more complex. FIG. 6C shows one possible example of a form, $P_2$. It includes a first fixed text zone $Z_{t1}$, similar to that ($Z_t$) in FIG. 6B, and one or more data capture zones, under the unique reference $Zt_{t2}$. As before, a send button $B_s$ is provided, but advantageously also a button $B_{raz}$ for reinitializing the form $P_2$, which makes it possible to erase the captured data in the event of error. The data capture zone or zones $Zt_{t2}$ can be of the "TEXTAREA" type in HTML and have a facility known as "elevator" for scrolling display of long texts.

The HTML code necessary for programming such a form is well known per se and is within the competence of one of average skill in the art. There is no need to describe it in detail again here. However, it might be noted that in particular it contains a line of code in HTML that is typically in the following form:

<form action="http://127.0.01:8080/cgi-smart/loader"> in which http://127.0.01:8080 is the feedback URL from relation (1), cgi-smart is the aforementioned CGI directory, containing a script "loader" associated with one of the applications stored in the smart card, for instance referred to by the symbol $A_e$. This application makes it possible to list the subscriber (internaut) in the directory $SA_u$ with the profile $PA_u$. This action is done as described in conjunction with FIG. 5, by using the functions offered by the smart card 2a, that is, on the one hand, CGI, and client/server, on the other. The application $A_e$ behaves like a client.

In the first case (FIG. 6B), it is not necessary to send parameters to the smart card 2a. In fact, the data for the subscriber profile $PA_u$ are unique and are recorded in the smart card 2a.

In the second case (FIG. 6C), the data captured are sent as parameters to the smart card 2a, in the form of an http request.

FIG. 6D schematically illustrates the global process of the phase of listing a subscriber in a directory server $SA_u$, comprising one of the servers r (FIGS. 2 or 4).

The unique reference symbol $S_{WEB}$ combines different modules that have been explained in conjunction with FIG. 5, which modules enable the smart card 2a to offer the combined functions of client/webserver and CGI or gateway. It has also been assumed that the application Ae that enables the use of the listing protocol PE was assigned to a dedicated script translator agent At$e$. This involves a configuration in accordance with that shown in FIG. 5. However, as has been noted, the translation of the scripts can be done in other ways (by the web agent$_1$), etc. Sending the form, by opening sessions between matched agents, makes it possible to activate the application $A_e$ by way of the script translator agent $At_e$.

In a later step, the application $A_e$ makes an http request by opening sessions between pairs of agents, which in particular requires an agent of the "network" type (132 in FIG. 5). The request is transmitted to a directory server $SA_i$, with parameters being sent. The parameters in particular comprise the subscriber profile data $PA_u$, so as to enable the subscriber to be listed in the directory. The URL address of the directory server is obtained from the subscriber profile $SA_u$ recorded in the smart card 2a, or from data acquired in the form $P_2$.

A priori, the listing process is terminated at this stage. However, it can include one or more additional steps. One of these steps can consist of sending an acknowledgment of receipt by the directory, in the form of an http request addressed to the smart card 2a. The acknowledgment of receipt can include an item of information indicating that the inscription proceeded satisfactorily, or if not, an error code. In the latter case, the listing process must be repeated. The server ask for the missing data to be sent or for incorrect or corrupted data to be retransmitted. The request for listing can also be rejected, especially if the limit for validity of the subscription has elapsed.

In a preferred variant of the method of the invention, it is possible for a subscriber to list himself in several different directories. In this variant embodiment, it is in general necessary also to have a plurality of listing protocols available. To do so, a plurality of applications associated with these protocols are stored in the smart card 2a, and can be referred to by reference symbols $A_{e1}, \ldots, A_{ei}, \ldots, A_{en}$, where the maximum number of separate protocols is n.

As before, the data associated with the subscriber profiles, which will be called $PA_1, \ldots, PA_j, \ldots, PA_q$, can be stored in the smart card 2a, or conversely furnished, stroke by stroke, by the subscriber in a method similar to what has been described in conjunction with FIG. 7C, by capture in a suitable form. The letter q is the maximum of subscriber profiles available. It should be noted that q is not necessarily equal to n. In fact, a given directory server, which can arbitrarily be called $SA_i$, can accept a plurality of separate occurrences of the same subscriber (subscriber), on the one hand. On the other, a plurality of subscriber servers, although separate, can accept the same subscriber profile and optionally share a common listing protocol.

To define the concepts, let it be assumed that the smart card 2a stores four separate subscriber profiles $PA_A$–$PA_D$, each of the profiles enabling listing the subscriber in a single directory server, hence $SA_A$–$SA_D$. A form or welcome page $P_3$ makes this listing possible can be in the form schematically illustrated in FIG. 6E. It includes a first header text zone $Z_{te}$, similar to the text zone $Z_t$ of FIG. 6B, optionally supplemented with graphic zones. It includes four additional text zones $Z_{tA}$–$Z_{tD}$, associated with the four directory servers $SA_A$–$SA_D$. The form makes it possible to select one or more of them, or all of them.

To make a choice among these directory servers, zones called "boxes to be checked" $CC_A$–$CC_D$ can be provided. As an alternative, hyperlinks can be provided on the welcome page $P_3$, each hyperlink addressing the smart card 2a by way of a feedback address of the type in statement (1), but with separate parameters.

As in the case of FIG. 6B, a send button $B_S$ is provided, making it possible to transmit the contents of the form to the smart card 2a.

Regardless of the method used to make the selection of all or some of the directory servers, the parameters sent to the smart card 2a must allow the selection of one or more subscriber profiles $PA_A$ through $PA_D$, and the derivation from them of one or more URL addresses. The actions required by the parameters sent to the smart card 2a are typically of the following type:

$$?sa_i=enr+pa_j \qquad (5),$$

where "$sa_i$" is the name of the directory server with an arbitrary subscript i among the n possible examples, "enr" is the action required for listing per se, and "$pa_j$" is the subscriber profile to be used, from among the q possible ones.

One or more http requests are presented and transmitted to the directory servers in question, $SA_A$ through $SA_D$ (FIG. 6E) and in general $SA_A$ through $SA_n$, if there are n directory servers that can be selected.

The choice presented on the welcome page P is naturally a function of the smart card 2a inserted into the reader 3. The choices presented depend on the rights that are allowed to the subscriber who owns the smart card 2a, in particular subscriptions to given services and their periods of validity.

A second phase of the method of the invention, that is, locating a subscriber associated with an arbitrary identifier in the internet network, can proceed in a manner quite similar to the listing phase.

This requires consulting one or more directory servers. It is also necessary to have at least one specific protocol PL for locating this subscriber. Finally, if there are a plurality of directory servers that can be consulted, $SA_1$ through $SA_n$, it is also generally necessary, as in the case of listing, to have a plurality of separate locating protocols available.

These locating protocols can be employed with the aid of applications stored in the smart card 2a.

The locating process proceeds in a manner quite similar to that of listing the subscriber in one or more directory servers $SA_i$. The only notable exception is that a subscriber profile $PA_j$ is no longer explicitly required. It suffices to furnish the smart card 2a with the identifier of the subscriber sought and the address of the directory server $SA_i$, or at least parameters that enable the application assigned to one of the locating profiles to determine this URL address. A subscriber profile $PA_j$ can nevertheless be used, so that from it the URL address of the directory server $SA_i$, with the aid of which a subscriber wishes to locate another subscriber, can be derived automatically. As has been indicated, the identifier of the subscriber sought can be his e-mail address, and this address is typically in the following form:

$$\text{pseudo@provider.com} \qquad (6),$$

where "pseudo" is the name of the user of the subscriber's e-mail service, or more generally a pseudonym, and "provider.com" is the name and suffix of the internet service provider (".com" can be replaced as applicable by various suffixes, such as ".fr", ".net", etc.).

FIG. 7 illustrates the principal steps in the phase of locating a subscriber with whom one seeks to establish a telephone communication, by consulting a directory $SA_i$.

In a first step, the smart card 2a is addressed by the navigator 10 of the terminal 1, via the layers 13 and 23a. By a command of the "GET" type, for example, a loading form is retrieved from the smart card 2a, in the form of a welcome page P'. This welcome page can assume various aspects, in particular similar to those described in conjunction with FIG. 6C or FIG. 6E. Depending on whether there are one or more possible choices, the subscriber selects one or more directory servers and furnishes the identification data for the subscriber sought. In FIG. 8, it has been assumed that only a single directory server $SA_i$ could be consulted.

The page is transmitted in the form of an http request to the smart card 2a and is interpreted by a script translator agent $At_j$ associated with an application $A_j$ for implementing the protocol PL.

By the dual mechanism, client/webserver and CGI (a module $S_{WEB}$ as before), a request of the following type:

$$\text{http://127.0.0.1/?sa}_i\text{=loc+pseudo@provider.com} \quad (7)$$

is interpreted by the smart card 2a as a request for locating the subscriber, whose identifier is (6), in the directory server $SA_i$.

An http request is transmitted to this server, which sends the information requested, if available. It consults its database for an IP address corresponding to the identification data received. If it is successful, that is, if the requesting subscriber is in fact listed, if this subscriber has the right to obtain this address, and if the data received are correct, then the data retransmitted include the IP address of the subscriber sought, which makes it possible to locate him.

These various steps employ sessions between matched agents, according to one of the aspects of the invention.

It is also possible for a plurality of applications to be stored in the smart card 2a, each of them being intended to implement a separate locating protocol assigned a priori to an also-separate directory server.

In a preferred variant of the method of the invention, applications making it possible to implement a plurality of listing protocols, a plurality of locating protocols, and data files for listing a plurality of subscriber profiles are stored in the smart card 2a. This advantageous arrangement makes it possible to convert the smart card 2a into a portable, multi-directory database, illustrated schematically by FIG. 8. In this figure, terminal 1 is not shown. However, it is understood that the terminal is necessary to perform the method of the invention.

The listing protocols, locating protocols, and subscriber files carry unique reference symbols $PE_x$, $PL_y$, and $PA_z$, respectively, where x is the number of listing protocols, y the number of locating protocols, and z the number of separate subscriber profiles. This set makes it possible to make connections with n separate directory servers, either to list in them a subscriber who is the holder of the smart card 2a, or to locate a subscriber on the internet network RI.

In still another variant of the method of the invention, using a smart card 2a makes robust authentication of its owner possible, in the listing phase and/or the locating phase. It is in fact possible to store security data in the smart card, which remains the property of its owner. Such security data can comprise encryption keys.

Because in one of the advantageous aspects of the method of the invention the smart card 2a can communicate directly with the internet network by employing sessions between agents, these data do not have to be transmitted to an external device, such as the terminal 1. The processing operations involving security are performed directly by the smart card 2a. Proceeding in this way accordingly offers a much higher degree of security than simply using safeguarded software layers of web navigators of recent vintage, known by the abbreviation SSL (for Secure Socket Layer).

The authentication per se can be done with recourse to what is known as the certificate technique, in association with the aforementioned encryption keys stored in the smart card 2a. This procedure can require additional transactions between the smart card 2a and the directory server or directory servers in question, with the aid of http requests traveling over the internet network RI. As a function of the result, whether positive or negative, of the authentication, the subscriber either is or is not authorized to perform the processing operations, listing, or locating operations he wishes to perform.

From the above description, it can easily be confirmed that the method of the invention indeed attains the objects set for it.

In particular, it enables a subscriber to list himself in one or more directory servers and/or to locate a subscriber in the internet network, also by way of one or more directories. Because the smart card has the combined functions of a client/webserver and a gateway or CGI, this arrangement enables direct communications between the smart card and the directory server or directory servers. As a result, it authorizes the storage of the specific programs required to use the listing and/or locating protocols, which makes high mobility possible. One or more subscriber profiles can also be stored in the smart card. The subscriber is not compelled to use terminals configured specifically for the aforementioned protocols.

In particular, in a preferred variant embodiment, the smart card is converted into a multi-directory portable database.

The method of the invention is entirely compatible with the existing art. It is not necessary for the subscriber being sought to be listed in one or more directory servers by using the method of the invention, nor to be provided with a terminal that has a smart card reader according to the invention. The transmissions over the internet network are done in accordance with the protocols in force, and the communications between the terminal and the smart card make use of the aforementioned standardized ISO protocol. Hence a standard smart card reader can be employed. Only the presence of a specific software layer in the terminal is necessary, and this requires only slight modifications, which can be done once and for all, regardless of how many listing and locating protocols and/or subscriber protocols are carried in the smart card, and regardless of their nature.

Finally, using a smart card makes it possible to safeguard transactions and in particular makes a "robust" authentication possible.

However, it should be clearly understood that the invention is not limited only to the exemplary embodiments explicitly described, in particular in conjunction with FIGS. 2–8.

In particular, it is not necessary for both series of proprietary software, PE and PL, to be stored in the smart card, although this arrangement is particularly advantageous. By way of non-limiting example, the phases of listing in one or more directory servers can be done once and for all, or at least, since a priori these are performed less often than the locating phases, it is sufficient to store only the specific applications associated with this latter operation in the smart card. Similarly, as has been noted, it is possible not to record the subscriber profiles PA in the smart card (since the data can be furnished in real time at the moment the subscriber is listed in a particular directory server). It is also possible for only a portion of the subscriber profiles to be recorded, which profiles could be furnished automatically.

The invention also relates to a method for putting a first user in relation with at least one directory server, with a view to listing him and/or locating at least a second user in a network, in particular of the internet type, said relation being effected by way of a terminal provided with a smart card reader and at least one piece of software, called listing and/or locating software, the terminal and the smart card including information processing means and information storage means, said terminal being connected to each of said directory servers via said internet-type network and communicating with smart card by a first predetermined protocol, characterized in that at least one of said pieces of software ($A_e$, $A_l$) is stored in said smart card (2a); that, because this smart card (2a) includes a first piece of software (23a), forming a specific communication protocol layer, and because said terminal (1) includes a second piece of software (13), forming a specific communication protocol layer, said first and second pieces of software (13, 23a) further include at least one pair of first matched software entities (132,), each of said entities (132, 232a) cooperating with one another, thanks to said information processing means, in such a way as to enable to establishment of a bidirectional data exchange session between at least said terminal (1) and said smart card (2a), and/or said internet-type network, in such a way that said smart card (2a) offers the function of a client/webserver; that said smart card (2a) includes, in the information storage means, at least a second software entity ($AT_e$, $AT_l$) cooperating with said specific piece of software (23a) so that said smart card offers a gateway interface function known CGI;

and that it includes at least the following steps:

1) opening a first sequence of data exchanges between at least said terminal (1) and said smart card (2a), for the transmission of a request for said web navigator (10) to retrieve data enabling the selection and activation of one of said proprietary pieces of software ($A_e$, $A_l$), with a view to selecting one of said directory servers ($SA_i$);

2) opening a second sequence of data exchanges between said smart card (2a) and said terminal (1) in order to transmit said data to the terminal, thanks to said information processing means of the terminal and of the smart card;

3) opening a third sequence of data exchanges between said terminal (1) and said smart card (2a), thanks to said information processing means of the terminal and of the smart card, to transmit selection data and optional parameters, said data and optional parameters including a reference to one of said pieces of listing and/or locating software;

4) implementing said CGI function and execution of said piece of listing and/or locating software ($A_e$, $A_l$), thanks to said information processing means of the smart card; and 5) as a result of said execution, opening a fourth sequence of data exchanges, thanks to said information processing means of the smart card, between said smart card (2a) and one of said directory servers ($SA_i$), selected by said selection data, in such a way as to transmit a request to perform a predetermined listing or locating operation.

The invention also relates to a smart card including information processing means and information storage means and intended for cooperation with a terminal provided with a smart card reader, for putting a first user in relation with at least one directory server, with a view to listing him and/or locating at least one second user in a network, in particular of the internet type, with the aid of predetermined listing and/or locating protocols, characterized in that said smart card (2a), in the information processing means, stores at least one piece of software ($A_e$, $A_l$) associated with said predetermined listing and locating protocols;

that said smart card (2a), in the information processing means, includes a piece of software (23a), forming a specific communication protocol layer, further including at least a first autonomous software entity ($S_1$), of the client type, and a second autonomous software entity ($S_2$) of the server type, said entities ($S_2$, $S_2$) cooperating, thanks to the information processing means, in such a manner that said smart card (2a) offers the function of a client/webserver and in such a way as to enable said putting of a first user in relation with at least directory server ($SA_i$), via said internet-type network (RI); and that said smart card (2a), in the information processing means, includes at least a second software entity ($AT_e$, $AT_l$) cooperating, thanks to the information processing means, with said specific piece of software (23a), so that said smart card (2a) will offer a gateway interface function or CGI enabling the execution of said pieces of software ($A_e$, $A_l$) associated with said predetermined listing and locating protocols.

The invention claimed is:

1. A method for communicating information between at least one directory server and a smart card, said method comprising the following steps:

1) opening a first sequence of data exchanges between a terminal connected to a smart card reader and said smart card, for transmission of a request by a web navigator in said terminal to retrieve data enabling selection and activation of one of a listing software and locating software with a view to selecting one of said directory servers, wherein the smart card receives request data identifying the data to be retrieved;

2) opening a second sequence of data exchanges between said smart card and said terminal in order to transmit said retrieved data to said terminal, wherein the web navigator receives said retrieved data;

3) after selecting and activating one of said listing software and locating software by using the retrieved data, opening a third sequence of data exchanges between said terminal and said smart card to transmit to said smart card data comprising selection data and optional parameters, said selection data and optional parameters including a reference to the selected and activated one of said listing software and locating software;

4) implementing a CGI function and executing the selected and activated one of said listing software and locating software; and 5) as a result of said executing step, opening a fourth sequence of data exchanges between said smart card and at least one of said directory servers according to said selection data in such a way as to transmit a request to perform a predetermined listing or locating operation.

2. The method of claim 1, wherein said terminal is connected to a smart card reader, said smart card reader and said smart card include first and second protocol stacks for said data exchanges by a first predetermined protocol which are defined by ISO Standard 7816, said first stack located in said terminal and said second stack located in said smart card, each stack including at least predetermined software communication protocol lower layers disposed in such a way as to enable said data exchanges between said smart card and said terminal, said lower layers forming an interface with a first software program in said terminal associated with said first stack and a second software program in said smart card associated with said second stack, said software programs form said specific communication protocol layers, respectively, and wherein first and second software programs each include a first and second software entities, said first software entity comprising a data transfer module forming an interface with said lower layers of said first and second protocol stacks, and said second software entity comprising a management module, said management module further comprising intelligent agents that establish bidirectional data exchange sessions for said data exchanges.

3. The method of claim 2, wherein one of said listing software and locating software has associated therewith a set of instructions comprising a script to be interpreted by said management module of said second software program, said management module corresponding to an intelligent script translator agent that furnishes orders that can be understood by one of said listing software and locating software.

4. The method of claim 1, wherein said step of opening a first sequence includes sending a request of an http type by an internet-type protocol by addressing, using an address of the URL feedback type, a predetermined page in HTML language containing said selection data and optional parameters.

5. The method of claim 1, wherein said step of opening a second sequence includes sending a form in HTML language to said smart card, and wherein said form includes at least one URL feedback address and a path leading to a predetermined directory associated with one of said listing software and locating software, said path for sending said optional parameters to one of said listing software and locating software.

6. The method of claim 5, wherein said step of opening a third sequence includes sending a request of the http type to said URL address designating said directory containing one of said listing software and locating software, said request including said selection data and said optional parameters.

7. The method of claim 6, wherein said listing software is associated with a first protocol enabling a listing of a first user in said predetermined directory server; wherein said optional parameters comprise profile data defining a subscriber profile including at least identification data for said first user; wherein said http request of said step of opening a third sequence includes first data indicating that said request is said listing of said first user and second data enabling the development, by said listing software, of a URL address characteristic of said predetermined directory server; and wherein said profile data associated with said subscriber profile are transmitted, during said implementing step, to said directory server in such a way as to accomplish said listing of said first user, said listing including an IP address in association with a directory server address of said directory server and said identification data of said first user.

8. The method of claim 7, further comprising sending an acknowledgment or an error code to said smart card.

9. The method of claim 8, further comprising data exchanges between one of said directory servers and said smart card in such a way as to authenticate said smart card or said first user, and that said authentication employs a certificate and at least one encryption key stored in said smart card.

10. The method of claim 6, wherein said locating software is associated with a second protocol enabling location of at least one second user in said internet-type network, said second user being listed in said predetermined directory server; wherein said listing includes at least identification data of said second user; wherein said http request of said step of opening a third sequence includes first data indicating that said request is said locating of said second user, second data for identifying said second user to be located, and third data making it possible for said locating software to develop a URL address characteristic of said predetermined directory server; and wherein said data identifying said second user are transmitted, during said implementing step, to this directory server, in such a way as to achieve said location of said second user by looking for an IP address, associating said second data for identifying this second user received by said directory server with said identification data stored in this directory, and retransmitting said IP address to said smart card so as to enable said location.

11. The method of claim 1, wherein said exchanges between said smart card and said terminal are preformed in protocol units.

\* \* \* \* \*